United States Patent
Li et al.

(10) Patent No.: US 11,586,927 B2
(45) Date of Patent: Feb. 21, 2023

(54) TRAINING IMAGE AND TEXT EMBEDDING MODELS

(71) Applicant: Google LLC, Mountain View, CA (US)

(72) Inventors: Zhen Li, Sunnyvale, CA (US); Yi-ting Chen, Cupertino, CA (US); Yaxi Gao, Sunnyvale, CA (US); Da-Cheng Juan, Sunnyvale, CA (US); Aleksei Timofeev, Mountain View, CA (US); Chun-Ta Lu, Sunnyvale, CA (US); Futang Peng, San Jose, CA (US); Sujith Ravi, Santa Clara, CA (US); Andrew Tomkins, Menlo Park, CA (US); Thomas J. Duerig, Sunnyvale, CA (US)

(73) Assignee: GOOGLE LLC, Mountainview, CA (US)

(*) Notice: Subject to any disclaimer, the term of this patent is extended or adjusted under 35 U.S.C. 154(b) by 966 days.

(21) Appl. No.: 16/265,793

(22) Filed: Feb. 1, 2019

(65) Prior Publication Data
US 2020/0250537 A1    Aug. 6, 2020

(51) Int. Cl.
*G06K 9/00*    (2022.01)
*G06N 3/084*   (2023.01)
(Continued)

(52) U.S. Cl.
CPC ........... *G06N 3/084* (2013.01); *G06F 16/538* (2019.01); *G06F 16/9538* (2019.01);
(Continued)

(58) Field of Classification Search
CPC .... G06N 3/084; G06N 3/0427; G06N 3/0445; G06F 16/538; G06F 16/9538;
(Continued)

(56) References Cited

U.S. PATENT DOCUMENTS

| | | | | |
|---|---|---|---|---|
| 8,280,881 B1* | 10/2012 | Zhou | ....................... | G06F 16/56 |
| | | | | 707/728 |
| 2014/0324836 A1* | 10/2014 | Chittar | ................ | G06V 10/242 |
| | | | | 707/722 |

(Continued)

OTHER PUBLICATIONS

International Preliminary Report on Patentability for Application No. PCT/US2019/057828, dated Aug. 12, 2021, 11 pages.
(Continued)

*Primary Examiner* — Ping Y Hsieh
(74) *Attorney, Agent, or Firm* — Dority & Manning, P.A.

(57) ABSTRACT

Methods, systems, and apparatus, including computer programs encoded on a computer storage medium, for training an image embedding model. In one aspect, a method comprises: obtaining training data comprising a plurality of training examples, wherein each training example comprises: an image pair comprising a first image and a second image; and selection data indicating one or more of: (i) a co-click rate of the image pair, and (ii) a similar-image click rate of the image pair; and using the training data to train an image embedding model having a plurality of image embedding model parameters.

20 Claims, 10 Drawing Sheets

(51) Int. Cl.
*G06F 16/538* (2019.01)
*G06F 16/9538* (2019.01)
*G06K 9/62* (2022.01)
*G06N 3/04* (2023.01)

(52) U.S. Cl.
CPC ......... *G06K 9/6215* (2013.01); *G06K 9/6254* (2013.01); *G06K 9/6257* (2013.01); *G06N 3/0427* (2013.01); *G06N 3/0445* (2013.01)

(58) Field of Classification Search
CPC .... G06F 16/55; G06K 9/6215; G06K 9/6254; G06K 9/6257
See application file for complete search history.

(56) References Cited

U.S. PATENT DOCUMENTS

| | | | |
|---|---|---|---|
| 2017/0243082 A1* | 8/2017 | Song | G06K 9/627 |
| 2018/0053042 A1 | 2/2018 | Philbin et al. | |
| 2018/0070895 A1* | 3/2018 | Kravis | A61B 5/01 |
| 2020/0250538 A1* | 8/2020 | Li | G06F 16/2425 |

OTHER PUBLICATIONS

PCT International Search Report and Written Opinion in International Application No. PCT/US2019/057828, dated Jan. 21, 2020, 16 pages.

PCT International Search Report and Written Opinion in International Application No. PCT/US2019/057841, dated Jan. 21, 2020, 16 pages.

U.S. Appl. No. 62/768,701, filed Nov. 16, 2018, Fuxman et al..

Bui et al. Neural Graph Machines: Learning Neural Networks Using Graphs, arXiv 1703.04818v1, Mar. 2017, 9 pages.

Wang et al, "Learning Deep Structure-Preserving Image-Text Embedding," IEEE Xplore, 2016, 9 pages.

Mao et al, "Training and Evaluating Multimodal Word Embeddings with Large-scale Web Annotated Images," arXiv.org, Nov. 2016, 9 pages.

* cited by examiner

TRAINING IMAGE AND TEXT EMBEDDING MODELS

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a training system implemented as computer programs on one or more computers in one or more locations that trains an image embedding model and a text embedding model using training data derived from a historical query log of a search system.

According to a first aspect there is provided a method performed by one or more data processing apparatus, the method including: obtaining training data including multiple training examples, where each training example includes: an image pair including a first image and a second image; and selection data indicating one or more of: (i) a co-click rate of the image pair, and (ii) a similar-image click rate of the image pair, where: the co-click rate of the image pair characterizes how often users select both the first image and the second image in response to both the first image and the second image being concurrently identified by search results for a search query; and the similar-image click rate of the image pair characterizes how often users select either the first image or the second image in response to the first image or the second image being identified by a search result for a search query respectively including either the second image or the first image; and using the training data to train an image embedding model having multiple image embedding model parameters, where the training includes, for each of the multiple training examples: processing the first image of the training example using the image embedding model to generate an embedding of the first image; processing the second image of the training example using the image embedding model to generate an embedding of the second image; determining a measure of similarity between the embedding of the first image and the embedding of the second image; and adjusting the image embedding model parameters based at least in part on: (i) the measure of similarity between the embedding of the first image and the embedding of the second image, and (ii) the selection data of the training example.

In some implementations, the training data is generated using a historical query log of a web search system.

In some implementations, the co-click rate for each training example indicates a fraction of times users selected both the first image and the second image of the training example in response to both the first image and the second image of the training example being concurrently identified by search results for a search query.

In some implementations, the similar-image click rate for each training example indicates a fraction of times users selected either the first image or the second image in response to the first image or the second image being identified by a search result for a search query respectively including either the second image or the first image.

In some implementations, the image embedding model includes a convolutional neural network.

In some implementations, adjusting the image embedding model parameters includes: determining a gradient of a loss function that depends on: (i) the measure of similarity between the embedding of the first image and the embedding of the second image, and (ii) the selection data of the training example; and using the gradient to adjust the image embedding model parameters.

In some implementations, the loss function includes a multiplicative scaling factor that is determined based on the selection data of the training example.

In some implementations, the multiplicative scaling factor is determined as a linear combination of the co-click rate and the similar-image click rate of the training example.

In some implementations, determining a measure of similarity between the embedding of the first image and the embedding of the second image includes: determining a Euclidean distance between the embedding of the first image and the embedding of the second image.

According to a second aspect there is provided a system including: one or more computers; and one or more storage devices communicatively coupled to the one or more computers, where the one or more storage devices store instructions that, when executed by the one or more computers, cause the one or more computers to perform operations including the operations of the previously described method.

According to a third aspect there is provided one or more non-transitory computer storage media storing instructions that when executed by one or more computers cause the one or more computers to perform operations including the operations of the previously described method.

Particular embodiments of the subject matter described in this specification can be implemented so as to realize one or more of the following advantages.

The training system described in this specification can generate a large amount of training data (e.g., tens or hundreds of millions of training examples) for use in training an image embedding model and a text embedding model by processing data from a historical query log of a search system. The large amount of training data that can be efficiently derived from historical query logs (e.g., of web search systems) enables the training system to train highly effective image and text embedding models. Such scalability (for example, to training examples which can potentially include hundreds of millions of search queries) is a technical improvement in the field of model training. For example, this scalability enables training of an image embedding model that generates image embeddings that implicitly characterize a wide range of concepts (e.g., foods, scenes, landmarks, man-made products, and the like). In contrast, some conventional image embedding models generate image embeddings which can implicitly characterize only a narrow range of concepts (e.g., only food, or only landmarks).

The training system can process a historical query log to generate "query-image" training examples which associate a textual search query with a related image (e.g., an image that users frequently select when it is identified by a search result for the textual search query). In particular, the query-image training examples can associate highly specific textual search queries (e.g., "red 2014 ford mustang") with related images (e.g., which depict objects specified by the textual search queries). By jointly training an image embedding model and a text embedding model using query-image training examples derived from a historical query log, the training system can cause the image embedding model to generate image embeddings which implicitly represent highly specific concepts. For example, the trained image embedding model may process an image to generate an embedding of the image that implicitly represents the color, make, and model of a car depicted in the image. This is a technical improvement in the field of model training, In contrast, for example, training the image embedding model and the text embedding model using training examples which associate images with generic labels (e.g., "car"), as in some conventional training data sets, may cause the image embedding model to generate relatively uninformative embeddings.

In some implementations, the training system can generate query-image training examples which include search queries expressed in a large number of different natural languages (e.g., English, French, German, and the like). By jointly training an image embedding model and a text embedding model using multi-lingual query-image training examples, the training system can train the text embedding model to generate informative text embeddings independent of the language of the text. For example, the training system can train the text embedding model to generate similar embeddings of the text "young Queen Elizabeth" (in English) and "jeune Reine Elizabeth" (in French) based on the similarity of images associated with search queries including this text. This is another technical improvement in the field of model training, The training system can train an image embedding model and a text embedding model based on selection data which characterizes, for example, how frequently two images are "co-clicked" or how frequently a given image is selected when it is identified by a search result for a search query (i.e., through "image-image" training examples). The selection data can be determined by aggregating user-derived signals (e.g., clicks) over millions of users and enables the training system to train the image embedding model and the text embedding model more effectively.

Generating training data using conventional methods lacks many of the advantages of generating training data by processing a historical query log of a search system. For example, manually generating training data (e.g., by a person manually specifying textual labels for images) is time-consuming and difficult, and generally only relatively small amounts of training data can be generated in this manner. As another example, generating training data by associating images and captions drawn from a social network (or other source) may produce less and lower-quality training data than generating training data from a historical query log, for example, because the captions may not accurately characterize the contents of the images.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

This specification describes a training system for training an image embedding model and a text embedding model using training data derived from a historical query log of a search system. The training data derived from the historical query log can include: query-image training examples, image-image training examples, or both.

A query-image training example includes: (i) a textual search query, (ii) an image, and (iii) selection data characterizing how often users selected the image in response to the image being identified by a search result for the textual search query. The training system can jointly train the image embedding model and the text embedding model to generate similar embeddings of the textual search query and the image if the selection data indicates that users frequently select the image when it is identified by a search result for the search query.

An image-image training example includes an image pair (including a first image and a second image) and selection data that indicates: (i) a co-click rate of the image pair, (ii) a similar-image click rate of the image pair, or (iii) both. The co-click rate of the image pair characterizes how often users select both the first image and the second image in response to both the first image and the second image being concurrently identified by search results for a search query. The similar-image click rate of the image pair characterizes how often users select the first image in response to the first image being identified by a search result for a search query that includes the second image, or vice versa. The training system can train the image embedding model to generate similar embeddings of the first image and the second image if their co-click rate, similar-image click rate, or both, indicates they are related.

In some implementations, the training system can use the query-image training examples and the image-image training examples derived from the historical query log to jointly train the image embedding model and the query embedding model using a graph-regularized loss function. In particular, the query-image training examples and the image-image training examples can be represented as a graph structure, and the training system can jointly train the image embedding model and the query embedding model using a loss function based on this graph structure.

These features and other features are described in more detail below.

Figure 1:
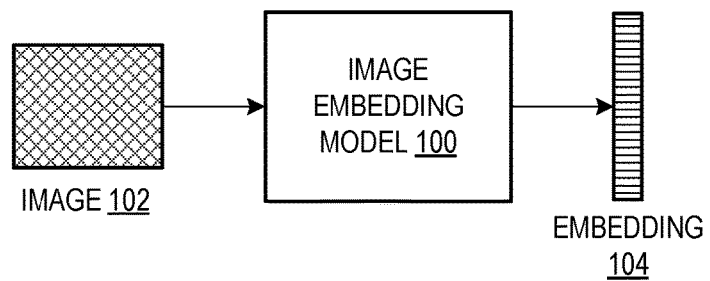
FIG. 1 shows an example image embedding model.

FIG. 1 shows an example image embedding model 100. The image embedding model 100 is configured to process an image 102 in accordance with current values of a set of image embedding model parameters to generate an embedding 104 of the image 102. The embedding 104 is a representation of the image 102 as an ordered collection of numerical values, for example, as a vector or matrix. As will be described in more detail below, the image embedding model 100 can be trained using machine learning techniques to generate an embedding 104 of an image 102 which implicitly represents the semantic content of the image 102 (e.g., objects depicted by the image 102).

The image embedding model 100 may be configured to process images 102 which are represented in any appropriate format. For example, the image embedding model 100 may be configured to process images 102 which are represented in a red-green-blue (RGB) color format (i.e., a format which represents an image by associating respective red, green, and blue color values with each pixel of the image). As another example, the image embedding model 100 may be configured to process feature representations of the images 102, for example, histogram of oriented gradient (HOG), scale-invariant feature transform (SIFT), or speeded up robust feature (SURF) representations of the images 102. Other feature representations can also be used for training.

The image embedding model 100 may be a neural network model implemented by computer programs on one or more computers in one or more locations. For example, the image embedding model 100 may be a convolutional neural network with an architecture derived from the Inception neural network or the ResNet neural network.

Figure 2:
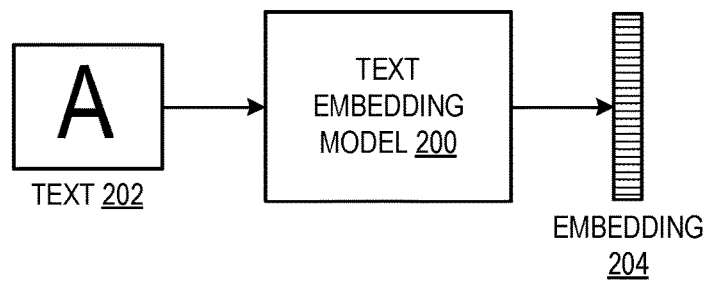
FIG. 2 shows an example text embedding model.

FIG. 2 shows an example text embedding model 200. The text embedding model 200 is configured to process a representation of a sequence of one or more words in a natural language (i.e., the text 202) in accordance with current values of a set of text embedding model parameters to generate an embedding 204 of the text 202. The embedding 204 is a representation of the text 202 as an ordered collection of numerical values, for example, as a vector or matrix. As will be described in more detail below, the text embedding model 200 can be trained using machine learning techniques to generate an embedding 204 of the text 202 which implicitly represents the semantic content of the text 202 (e.g., objects described by the text 202).

The text embedding model 200 may be configured to process text 202 which is represented in any appropriate format. For example, the text embedding model 200 may be configured to process text 202 which is represented as a sequence of "one-hot" vectors, where each one-hot vector represents a respective character (or word) of the text 202.

As another example, the text embedding model 200 may be configured to process text 202 which is represented by the output of a Word2vec model.

The text embedding model 200 may be a neural network model implemented by computer programs on one or more computers in one or more locations. For example, the text embedding model 200 may be a convolutional neural network with an architecture that includes multiple one-dimensional (1D) convolutional layers. As another example, the text embedding model 200 may be a lookup based mapping from text 202 to embeddings 204. As another example, the text embedding model 200 may be a sequence of fully-connected layers configured to process n-gram text tokens. As another example, the text embedding model may be a recurrent neural network model (e.g., an LSTM) that is configured to sequentially process representations of characters of the text 202.

Figure 3:
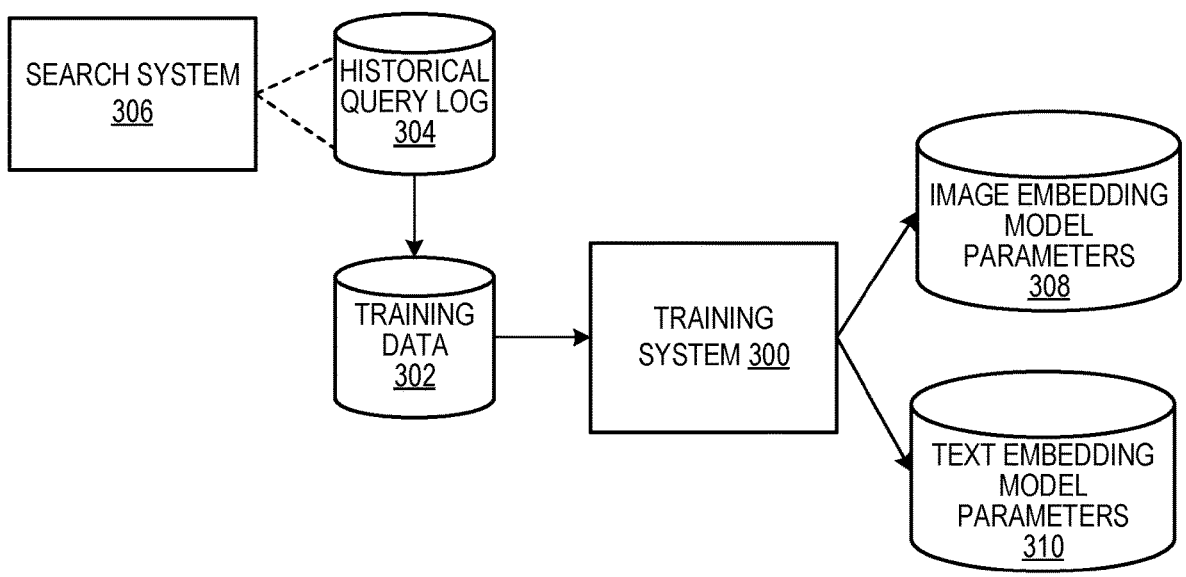
FIG. 3 shows an example training system for training the image embedding model and the text embedding model using training data derived from a historical query log of a search system.

FIG. 3 shows an example training system 300 for training the image embedding model 100 and the text embedding model 200 using training data 302 derived from a historical query log 304 of a search system 306. The training system 300 trains the image embedding model 100 and the text embedding model 200 by determining the values of the image embedding model parameters 308 and the text embedding model parameters 310. For example, when the image embedding model 100 and the text embedding model 200 are implemented as respective neural networks, the training system 300 can iteratively adjust the parameters of the neural networks using gradients of a loss function, as will be described in more detail below. The training system 300 may be implemented by computer programs on one or more computers in one or more locations. In some implementations, the training system 300 uses one or more tensor processing units (TPUs—an application-specific integrated circuit (ASIC) designed for machine learning) during training of the image embedding model 100 and the text embedding model 200.

The search system 306 can be any system configured to perform image searches by processing search queries which includes text, images, or both, to generate search results which identify images responsive to the search queries. An example search system is described in more detail with reference to FIG. 11.

The historical query log 304 of the search system 306 indexes a large number (e.g., millions) of search queries previously processed by the search system 306. In particular, the historical query log 304 can index a search query by maintaining data including: (i) the search query, and (ii) data which specifies one or more search results that were selected by the user of the device which transmitted the search query. A user can "select" a search result by expressing an interest in the search result through any kind of interaction with the search result. For example, a user can select a search result by clicking on a hypertext link included in the search result, or by hovering a cursor over the search result for a predefined period of time, to generate a request for an electronic document (e.g., image) identified by the search result.

The training system 300 can process data from the historical query log 304 to generate query-image training examples and image-image training examples used to train the image embedding model 100 and the text embedding model 200.

A query-image training example includes: (i) a textual search query, (ii) an image, and (iii) selection data characterizing how often users selected the image in response to the image being identified by a search result for the textual search query. The training system 300 can jointly train the image embedding model 100 and the text embedding model 200 to generate similar embeddings of the search query and the image if the selection data indicates that users frequently select the image when it is identified by a search result for the search query. A similarity between embeddings can be determined using any appropriate numerical similarity measure (e.g., a Euclidean distance, if the image embedding model 100 and the text embedding model 200 are configured to generate embeddings of the same dimensionality).

An image-image training example includes an image pair (including a first image and a second image) and selection data that indicates: (i) a co-click rate of the image pair, (ii) a similar-image click rate of the image pair, or (iii) both. The co-click rate of the image pair characterizes how often users select both the first image and the second image in response to both the first image and the second image being concurrently identified by search results for a search query. The similar-image click rate of the image pair characterizes how often users select the first image in response to the first image being identified by a search result for a search query that includes the second image, or vice versa. The training system 300 can train the image embedding model 100 to generate similar embeddings of the first image and the second image if their co-click rate, similar-image click rate, or both, indicates they are related.

Figure 4:
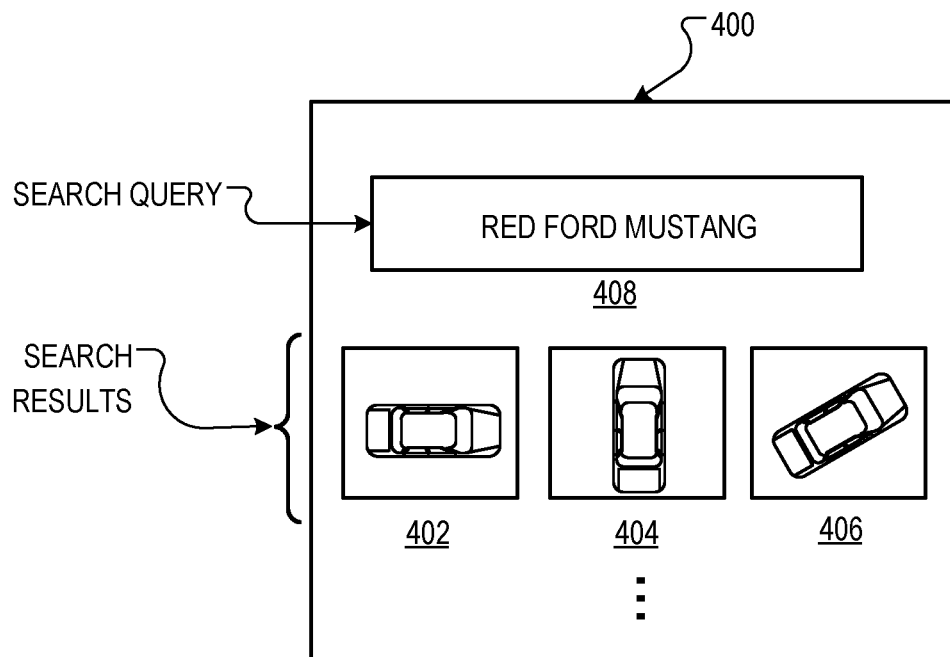
FIG. 4 shows an example search results page provided by the search system that includes image search results for a search query that includes a sequence of one or more words.

FIG. 4 shows an example search results page 400 provided by the search system 306 that includes image search results for a search query that includes a sequence of one or more words. In particular, the search results page 400 displays search results 402, 404, and 406 for the search query 408: "red ford mustang".

Figure 5:
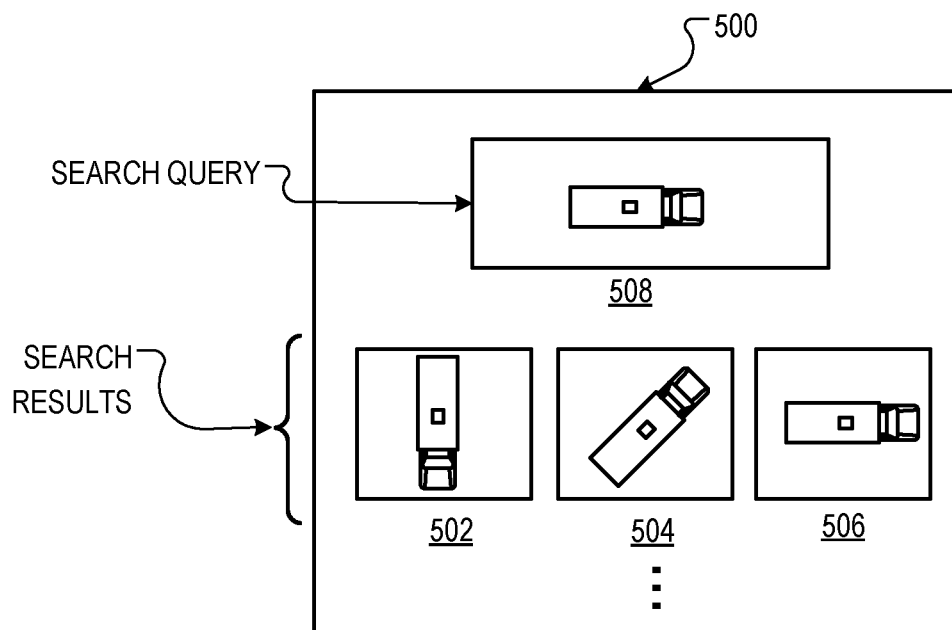
FIG. 5 shows an example search results page provided by the search system that includes image search results for a search query that includes an image.

FIG. 5 shows an example search results page 500 provided by the search system 306 that includes image search results for a search query that includes an image. In particular, the search results page 500 displays search results 502, 504, and 506 for the search query 508 that includes an image depicting a truck. In response to receiving a search query that includes a query image, the search system 306 may be configured to provide search results which identify images similar to the query image. In this example, each of the search results 502, 504, and 506 identify images which are similar to the query image.

A user is said to "co-click" a first image and a second image if the user selects search results which respectively identify the first image and the second image from the same set of search results. For example, a user may co-click the image identified by the search result 402 and the image identified by the search result 404 by selecting both of the search results (e.g., one after another) on the search results page 400. As another example, a user may co-click the image identified by the search result 504 and the image identified by the search result 506 by selecting both of the search results (e.g., one after another) on the search results page 500. If a user selects three or more search results from the same set of search results, the images identified by each pair of selected search results can be considered to be co-clicked. For example, if a user selects search results A, B, and C from the same set of search results, then the pairs of images identified by the search results {A, B}, {A, C} and {B, C} can be each considered to be co-clicked.

Figure 6:
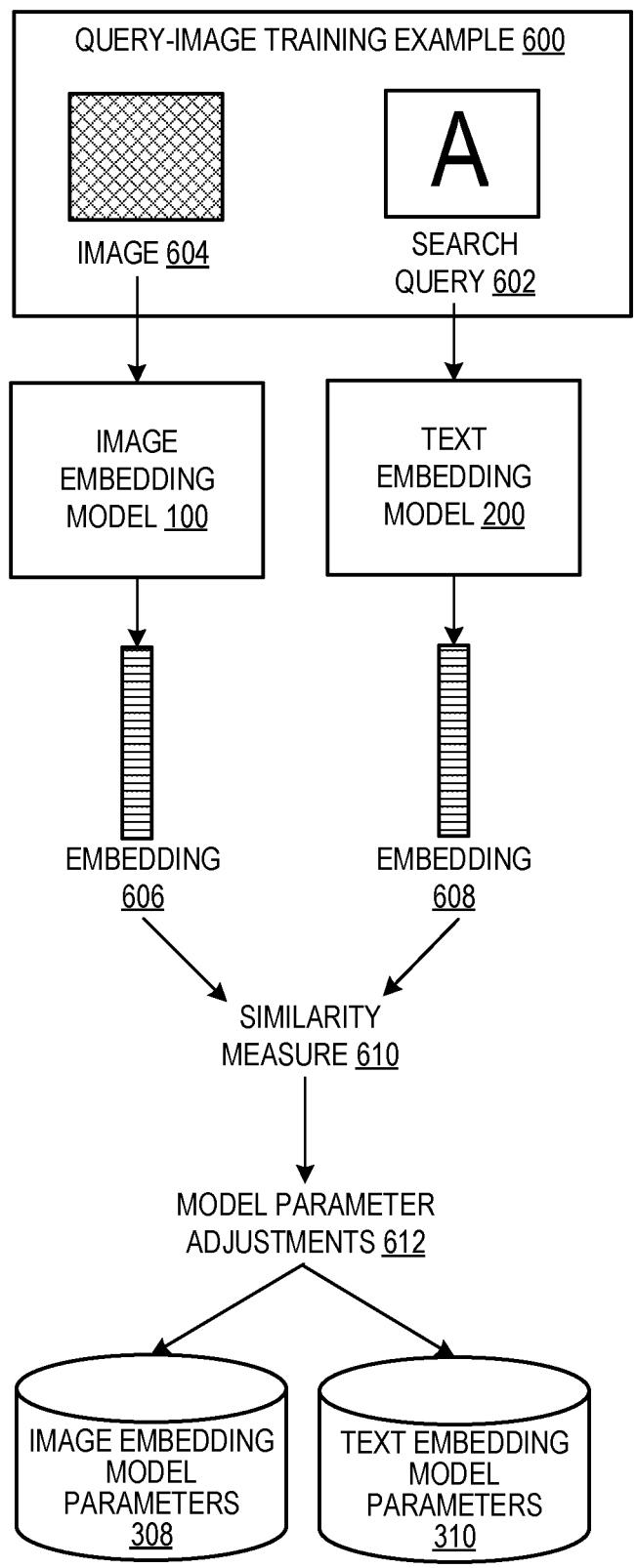
FIG. 6 illustrates an example process for jointly training the image embedding model and the text embedding model using a query-image training example.

FIG. 6 illustrates an example process for jointly training the image embedding model 100 and the text embedding model 200 using a query-image training example 600. The query-image training example 600 includes a search query 602 which includes a sequence of one or more words and an image 604. The training system 300 processes the image 604 using the image embedding model 100 and in accordance with current values of the image embedding model parameters 308 to generate an embedding 606 of the image 604. The training system 300 processes the search query 602 using the text embedding model 200 and in accordance with current values of the text embedding model parameters 310 to generate an embedding 608 of the search query 602.

The training system 300 determines a similarity measure 610 between the embedding 606 of the image 604 and the embedding 608 of the search query 602, and determines model parameter adjustments 612 based on the similarity measure 610. Thereafter, the training system 300 uses the model parameter adjustments 612 to adjust the values of the image embedding model parameters 308 and the text embedding model parameters 310. In some implementations, the training system 300 uses the selection data characterizing how often users selected the image 604 in response to the image 604 being identified by a search result for the search query 602 in determining the model parameter adjustments 612. An example process for jointly training an image embedding model and a text embedding model using query-image training examples is described in more detail with reference to FIG. 8.

Figure 7A:
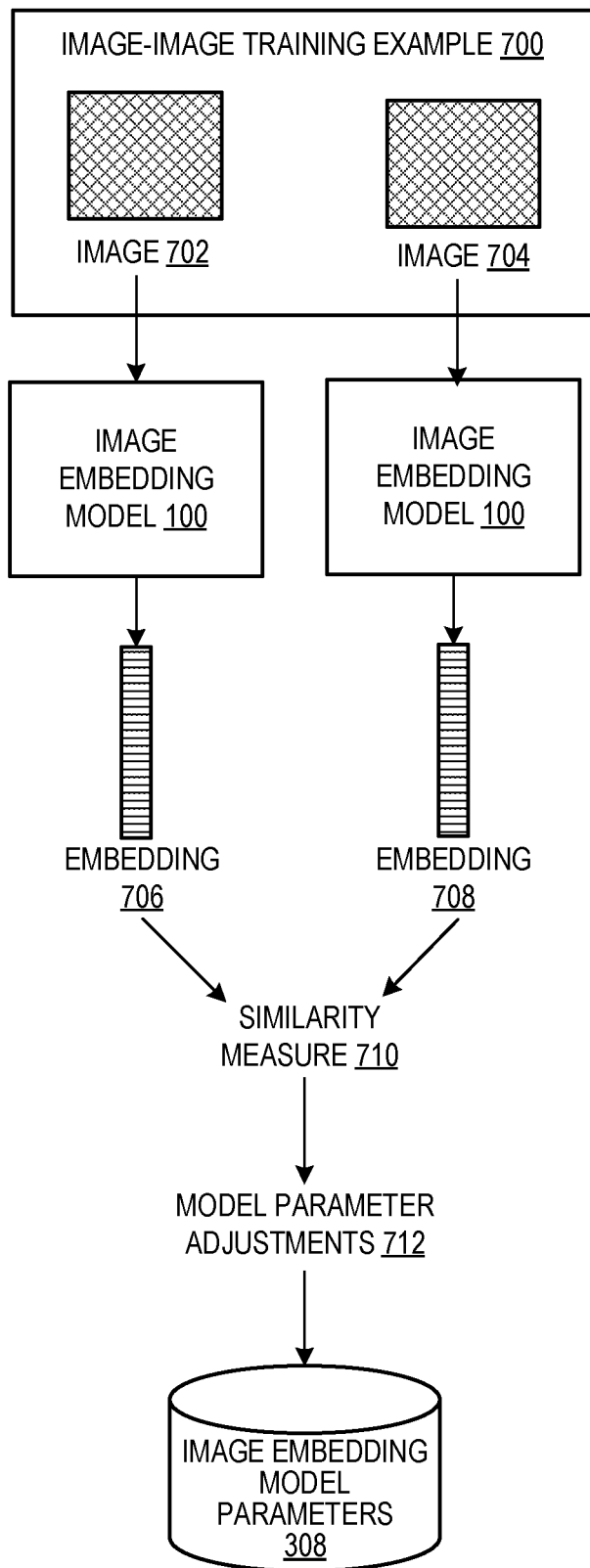
FIG. 7A illustrates an example process for training the image embedding model using an image-image training example.

FIG. 7A illustrates an example process for training the image embedding model 100 using an image-image training example 700 including a first image 702 and a second image 704. The training system 300 processes the first image 702 using the image embedding model 100 and in accordance with current values of the image embedding model parameters 308 to generate an embedding 706 of the first image 702. Similarly, the training system 300 processes the second image 704 using the image embedding model 100 and in accordance with current values of the image embedding model parameters 308 to generate an embedding 708 of the second image 704.

The training system 300 determines a similarity measure 710 between the embedding 706 of the first image 702 and the embedding 708 of the second image 704, and determines model parameter adjustments 712 based on the similarity measure 710. In some implementations, the training system 300 uses the selection data characterizing the co-click rate, the similar-image click rate, or both of the first image 702 and the second image 704 in determining the model parameter adjustments 712. An example process for training an image embedding model using image-image training examples is described in more detail with reference to FIG. 9.

Figure 7B:
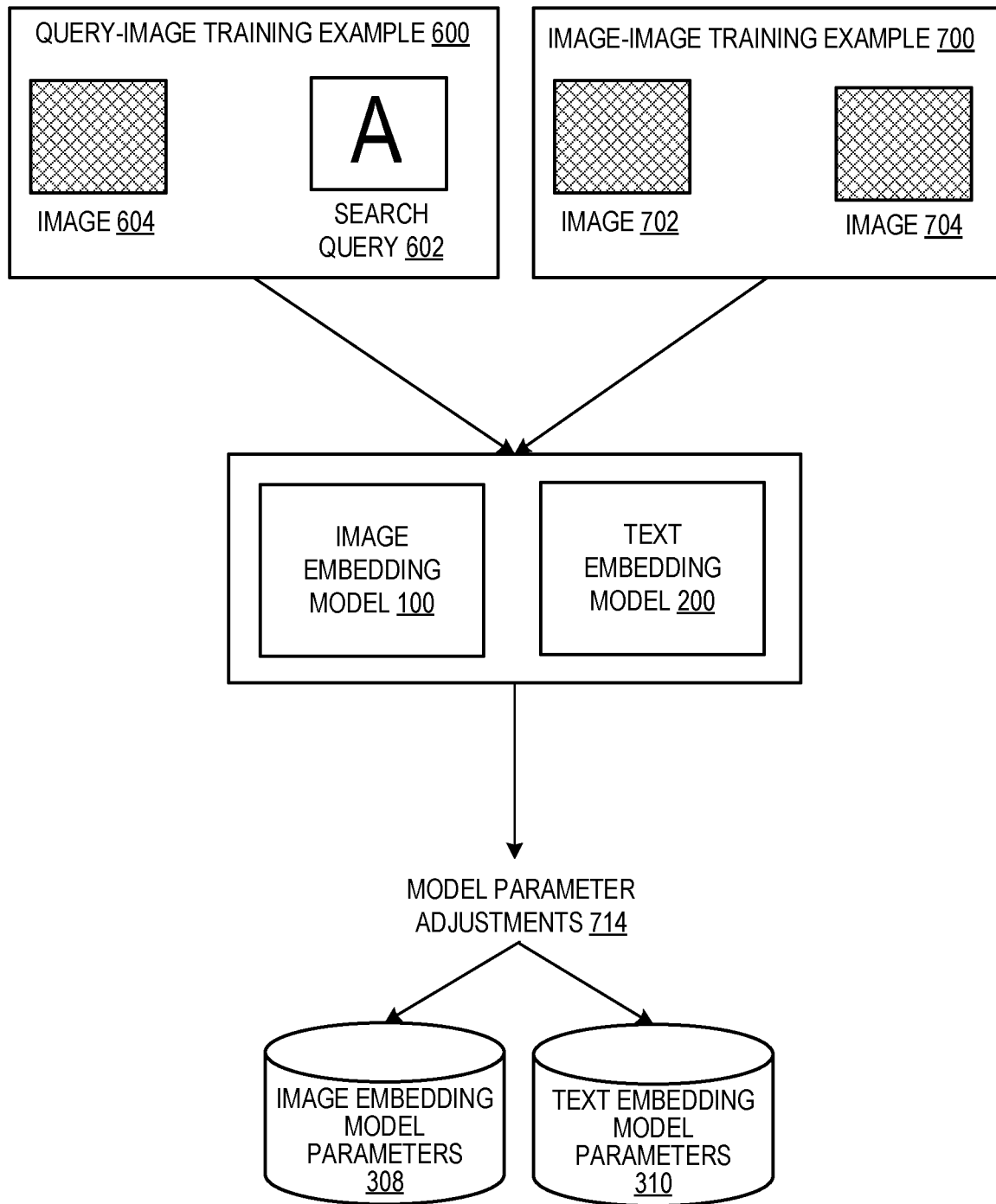
FIG. 7B illustrates an example process for jointly training the image embedding model and the text embedding model using query-image training examples and image-image training examples.

FIG. 7B illustrates an example process for jointly training the image embedding model and the text embedding model using query-image training examples and image-image training examples. In particular, at each of multiple training iterations, one or more query-image training examples 600 and one or more image-image training examples 700 can be processed by the image embedding model to generate respective embeddings (as described with reference to FIG. 6 and FIG. 7A). The training system 300 can determine respective model parameter adjustments 714 based on the query-image training examples 600 (as described with reference to FIG. 6) and the image-image training examples (as described with reference to FIG. 7A). The training system 300 can thereafter use the model parameter adjustments 714 to adjust the current values of the image embedding model parameters 308 and the text embedding model parameters 310. The model parameter adjustments that are determined based on the query-image training examples may be weighted more or less heavily (e.g., using a gradient scaling factor) than the model parameter adjustments that are determined based on the image-image training examples. The weighting applied to the model parameter adjustments may be a tunable system hyper-parameter.

Figure 8:
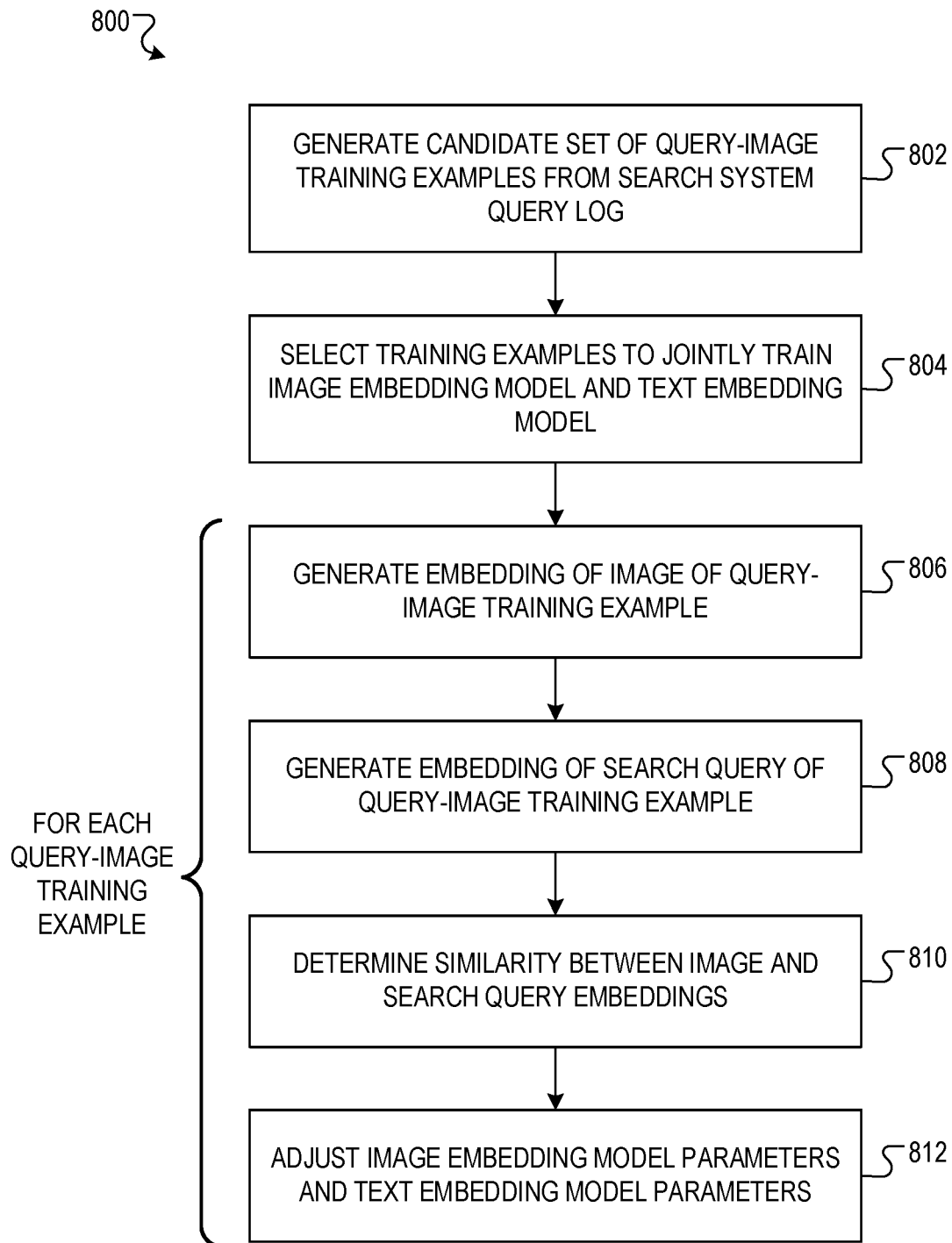
FIG. 8 is a flow diagram of an example process for jointly training an image embedding model and a text embedding model using query-image training examples derived from a historical query log of a search system.

FIG. 8 is a flow diagram of an example process 800 for jointly training an image embedding model and a text embedding model using query-image training examples derived from a historical query log of a search system. For convenience, the process 800 will be described as being performed by a system of one or more computers located in one or more locations. For example, a training system, e.g., the training system 300 of FIG. 3, appropriately programmed in accordance with this specification, can perform the process 800.

The system processes data from a historical query log of a search system to generate a candidate set of query-image training examples (802). Each of the query-image training examples includes: (i) a search query including a sequence of one or more words, (ii) an image, and (iii) selection data characterizing how often users selected the image in response to the image being identified by a search result for the search query. The selection data may indicate the fraction of times users selected the image in response to the image being identified by a search result for the search query.

The system selects query-image training examples for use in jointly training the image embedding model and the text embedding model from the candidate set of training examples based at least in part on the selection data of the training examples (804). For example, the system may select a particular query-image training example if the image of the particular training example is most frequently selected by users in response to the image being identified by a search result for the search query of the particular query-image training example. As another example, the system may select a particular query-image training example if the image of the particular query-image training example is in the top N images that are most frequently selected by users after being identified by search results for the search query of the particular query-image training example. The system can use any of a variety of other appropriate criteria in selecting query-image training examples for use in jointly training the image embedding model and the text embedding model. For example, the system may limit the number of selected query-image training examples which include search queries that specify the names of particular people, and corresponding images which depict the particular people. In this example, since the appearance of the same person can vary substantially between images (e.g., due to the person wearing different clothing, shoes, glasses, and the like), including a large number of query-image training examples corresponding to particular people may reduce the effectiveness of the training process.

Steps 806-812 describe an example process that can be performed for each selected query-image training example to jointly train the image embedding model and the text embedding model. For convenience, steps 806-812 describe steps that can be performed for a given query-image training example. More generally, any appropriate method can be used to jointly train the image embedding model and the text embedding model. For example, a stochastic gradient descent method can be used to jointly train the image embedding model and the text embedding model, where the steps 806-812 are iteratively repeated for "batches" (i.e., sets) of query-image training examples. In this example, the system may determine that the training is complete when a training termination criterion is satisfied. For example, the training termination criterion may be that a predetermined number of iterations of the steps 806-812 have been performed. As another example, the training termination criterion may be that a change in the values of the parameters of the image embedding model and the text embedding model between iterations of the steps 806-812 is below a predetermined threshold.

The system processes the image of the given query-image training example using the image embedding model and in accordance with current values of the image embedding model parameters to generate an embedding of the image (806). For example, if the image embedding model is a neural network model, the system processes the image using a sequence of neural network layers defined by the architecture of the neural network model.

The system processes a representation of the search query of the given query-image training example using the text embedding model and in accordance with current values of the text embedding model parameters to generate an embedding of the search query (808). For example, if the text embedding model is a neural network model, the system processes the representation of the search query using a sequence of neural network layers defined by the architecture of the neural network model.

The system determines a measure of similarity between the embedding of the image and the embedding of the search query of the given query-image training example (810). For example, the embedding of the image and the embedding of the search query may have the same dimensionality and the system may determine the measure of similarity by determining a Euclidean distance or cosine similarity measure between the respective embeddings.

The system adjusts the image embedding model parameters and the text embedding model parameters based at least in part on the measure of similarity between the embedding of the image and the embedding of the search query of the given query-image training example (812). For example, when the image embedding model and the text embedding model are respective neural network models, the system may determine the gradient of a loss function and use the gradient of the loss function to adjust the image embedding model parameters and the text embedding model parameters. The system can determine the gradient of the loss function using any appropriate method, for example, backpropagation. The loss function can be any appropriate loss function that depends on the measure of similarity between the embedding of the image and the embedding of the search query of the given query-image training example. A few examples follow.

In some implementations, the loss function may be a classification loss function. In these implementations, the search query of the given query-image training example is considered to identify a "positive" label for the image of the given query-image training example. The search queries of the other query-image training examples are considered to identify respective "negative" labels for the image of the given query-image training example. More specifically, the system may determine the similarity measure between the embedding of the image of the given query-image training example and the embedding of the search query of the given query-image training example as a "positive" score. The system may determine respective "negative" scores for each other training example as a similarity measure between the embedding of the image of the given query-image training example and an embedding of the search query of the other training example. The system can process the positive and negative scores using a soft-max (or sampled soft-max) function, and provide the output of the soft-max (or sampled soft-max) function to a cross-entropy loss function (or any other appropriate classification loss function).

In some implementations, the loss function may be a triplet loss function. In these implementations, the system may determine the embedding of the image of the given query-image training example to be the "anchor", the embedding of the search query of the given query-image training example to be the "positive", and the embedding of the search query of another query-image training example to be the "negative".

Optionally, the loss function may depend on the selection data for the given query-image training example which characterizes how often users selected the image in response to the image being identified by a search result for the search query of the given query-image training example. For example, the loss function may include a multiplicative scaling factor based on the fraction of times users selected the image in response to the image being identified by a search result for the search query of the given query-image training example.

Figure 9:
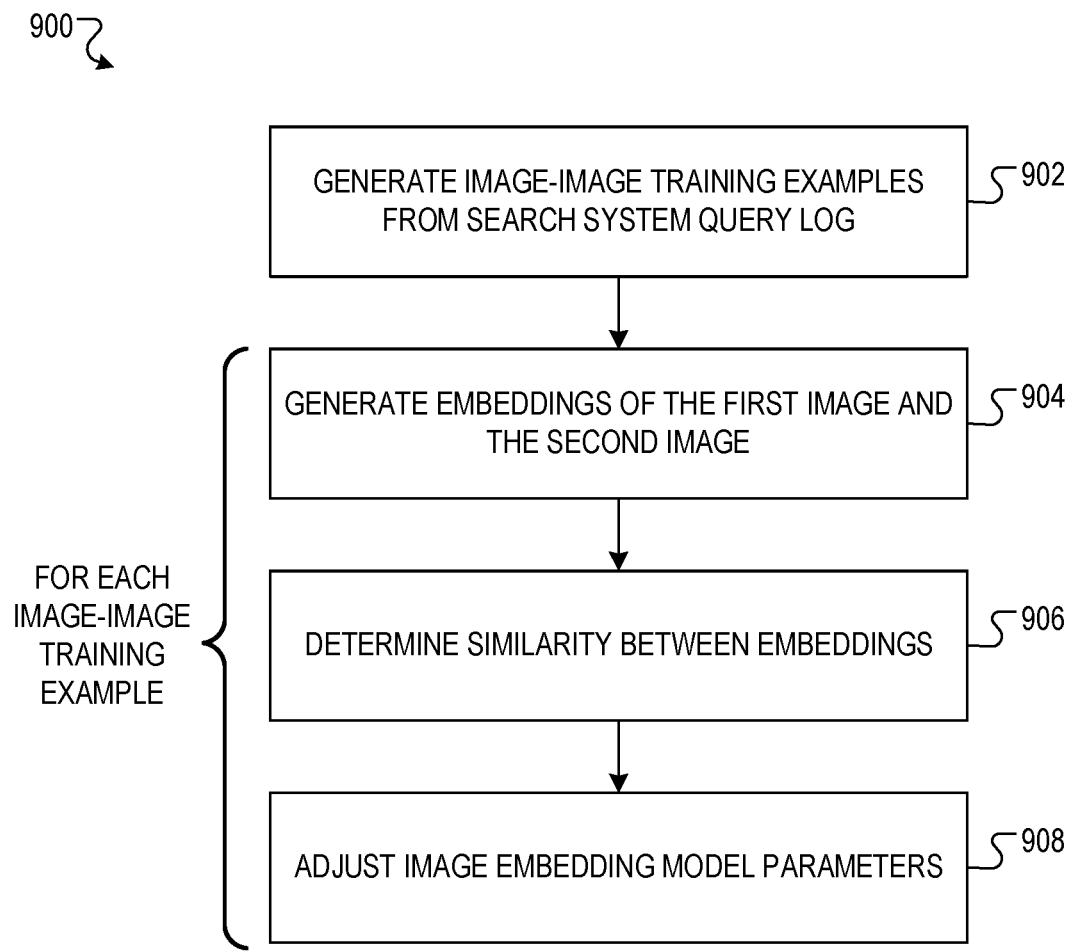
FIG. 9 is a flow diagram of an example process for training an image embedding model using image-image training examples derived from a historical query log of a search system.

FIG. 9 is a flow diagram of an example process 900 for training an image embedding model using image-image training examples derived from a historical query log of a search system. For convenience, the process 900 will be described as being performed by a system of one or more computers located in one or more locations. For example, a training system, e.g., the training system 300 of FIG. 3, appropriately programmed in accordance with this specification, can perform the process 900.

The system processes data from a historical query log of a search system to generate image-image training examples (902). Each of the image-image training examples includes: (i) an image pair including a first image and a second image, (ii) selection data indicating a co-click rate of the image pair, a similar-image click rate of the image pair, or both.

The co-click rate of the image pair characterizes how often users select both the first image and the second image in response to both the first image and the second image being concurrently identified by search results for a search query. For example, the co-click rate of the image pair may indicate the fraction of times users selected both the first image and the second image in response to both the first image and the second image being concurrently identified by search results for a search query.

The similar-image click rate of the image pair characterizes how often users select the first image in response to the first image being identified by a search result for a search query that includes the second image, or vice versa. For example, the similar-image click rate of the image pair may indicate the fraction of times users selected the first image in response to the first image being identified by a search result for a search query that includes the second image, or vice versa.

Steps 904-908 describe an example process that can be performed for each image-image training example to train the image embedding model. For convenience, steps 904-908 describe steps that can be performed for each image-image training example. More generally, any appropriate method can be used to train the image embedding model. For example, a stochastic gradient descent method can be used to train the image embedding model, where the steps 904-908 are iteratively repeated for "batches" (i.e., sets) of selected training examples. In this example, the system may determine that the training is complete when a training termination criterion is satisfied. For example, the training termination criterion may be that a predetermined number of iterations of the steps 904-908 have been performed. As another example, the training termination criterion may be that a change in the values of the parameters of the image embedding model between iterations of the steps 904-908 is below a predetermined threshold. As will be described in more detail with reference to FIG. 10, the image-image training examples can also be used in conjunction with query-image training examples to jointly train the image embedding model and the text embedding model using a graph-regularized loss function.

The system processes the first image and the second image of the training example using the image embedding model and in accordance with current values of the image embedding model parameters to generate respective embeddings of the first image and the second image of the training example (904). For example, if the image embedding model is a neural network model, the system processes the first image and the second image (e.g., one after another) using a sequence of neural network layers defined by the architecture of the neural network model.

The system determines a measure of similarity between the embedding of the first image and the embedding of the second image (906). For example, the system may determine the measure of similarity by determining a Euclidean distance or cosine similarity measure between the respective embeddings of the first image and the second image.

The system adjusts the image embedding model parameters based at least in part on: (i) the measure of similarity between the respective embeddings of the first image and the second image, and (ii) the selection data (i.e., the co-click rate, similar-image click rate, or both) (910). For example, when the image embedding model is a neural network, the system may determine the gradient of a loss function and use the gradient of the loss function to adjust the image embedding model parameters. The system can determine the gradient of the loss function using any appropriate method, for example, backpropagation. The loss function can be any appropriate loss function that depends on the measure of similarity between the respective embeddings and the selection data. For example, the loss function may be given by:

$$w \cdot \mathcal{D}(h_\theta(l_1), h_\theta(l_2)) \qquad (1)$$

where $h_\theta(l_1)$ represents the embedding of the first image of the image-image training example, $h_\theta(l_2)$ represents the embedding of the second image of the image-image training example, $\mathcal{D}(\cdot,\cdot)$ is a similarity measure (e.g., a Euclidean similarity measure), and the scaling factor w can be determined in any appropriate manner using the co-click rate, similar-image click rate, or both, of the image-image training example. For example, the scaling strength w can be determined as a linear combination (e.g., using predetermined weighting factors) of the co-click rate and similar-image click rate of the image-image training example.

Figure 10:
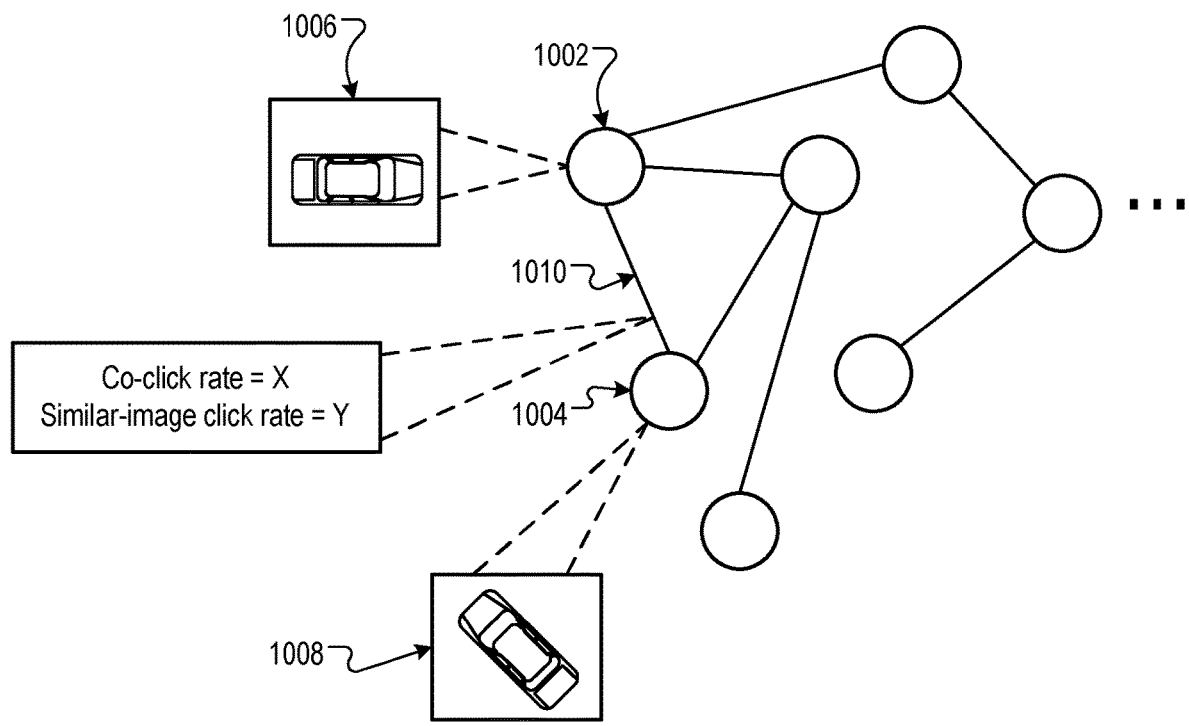
FIG. 10 shows an example of a portion of a graph representation of query-image training examples and image-image training examples.

In some implementations, the training system 300 can use the query-image training examples and the image-image training examples to jointly train the image embedding model 100 and the text embedding model 200 using a graph-regularized loss function. The query-image training examples and image-image training examples can be understood to represent a graph structure, where each node of the graph corresponds to a query-image training example and each edge corresponds to an image-image training example. More specifically, an edge in the graph which connects a first and a second node which respectively correspond to a first and a second query-image training example may be defined by an image-image training example which includes the image pair specified by the first and second query-image training examples. In particular, the "strength" of the edge connecting the first node and the second node may be defined based on the co-click rate, the similar-image click rate, or both, specified by the image-image training example corresponding to the edge. FIG. 10 shows an example of a portion of a graph representation, where nodes 1002 and 1004 represent query-image training examples which include respective images 1006 and 1008 of cars. In this example, the edge 1010 connecting the nodes 1002 and 1004 is associated with a co-click rate of X (where X can be a real number) and a similar-image click rate of Y (where Y can be a real number) for the image pair 1006 and 1008. More generally, some or all of the nodes of the graph may correspond to images included in image-image training examples, where the image is not included in any query-image training examples (i.e., is not associated with a corresponding textual search query).

In one example, the graph-regularized loss function may have the form:

$$\mathcal{L} = \sum_{i=1}^{N} \left( \mathcal{L}_1(I_i, Q_i) + \sum_{j \in \mathcal{N}(i)} w_{ij} \cdot \mathcal{D}(h_\theta(I_i), h_\theta(I_j)) \right) \quad (2)$$

where i indexes the nodes in the graph representation, N is the total number of nodes, represents the image associated with the i-th node (e.g., of the image-query training example corresponding to the i-th node, if there is one), $Q_i$ represents the search query of the image-query training example corresponding to the i-th node (if there is one), $\mathcal{L}_1(I_i, Q_i)$ represents the loss function associated with the image-query training example corresponding to the i-th node (e.g., the classification loss or triplet loss described with reference to 812), $\mathcal{N}(i)$ represent the set of "neighbors" of node i in the graph representation, $w_{ij}$ represents the strength of the edge connecting node i and node j in the graph representation, $h_\theta(I_i)$ represents the embedding of the image of associated with the i-th node, $h_\theta(I_j)$ represents the embedding of the image of the image associated with the j-th node, and $\mathcal{D}(\bullet, \bullet)$ is a similarity measure (e.g., a Euclidean similarity measure). Two nodes in the graph representation are said to be neighbors if they are connected by an edge. The strength $w_{ij}$ of the edge connecting nodes i and j can be determined in any appropriate manner using the co-click rate, similar-image click rate, or both, of the image-image training example which defines the edge. For example, the strength $w_{ij}$ of the edge connecting nodes i and j can be determined as a linear combination (e.g., using predetermined weighting factors) of the co-click rate and similar-image click rate. For nodes which are associated with an image but not a textual search query, the $\mathcal{L}_1(I_i, Q_i)$ component of the loss defied by equation 2 may be removed.

The training system 300 can jointly train the image embedding model 100 and the text embedding model 200 using a graph-regularized loss function (e.g., as described by equation 2) using any appropriate machine learning training technique. For example, the training system 300 can jointly train the image embedding model 100 and the text embedding model 200 by stochastic gradient descent using an alternative representation of the loss function in equation 2:

$$\mathcal{L} = \sum_{(i,j) \in \varepsilon} (w_{ij} \cdot \mathcal{D}(h_\theta(I_i), h_\theta(I_j)) + c_{ij}) \quad (3)$$

$$c_{ij} = \frac{1}{|i|} \mathcal{L}_1(I_i, Q_i) + \frac{1}{|j|} \mathcal{L}_1(I_j, Q_j) \quad (4)$$

where i and j index the nodes of the graph representation, $(i,j) \in \varepsilon$ if node i and node j are connected by an edge in the graph representation, |i| represents the number of edges incident to node i, |j| represents the number of edges incident to node j, and the remaining variables are defined in the same manner as for equation 2. In this example, the training system 300 can perform stochastic gradient descent by sampling edges from the graph representation at each training iteration and using backpropagation (or any other appropriate technique) to determine the gradient of the loss function given by equations 3 and 4. The training system 300 can determine the training is complete when any appropriate training termination criterion is satisfied, for example, when a predetermined number of iterations of stochastic gradient descent have been performed. An example method for training the image embedding model 100 and text embedding model 200 using a graph-regularized loss function is described with reference to: T. D. Bui, S. Ravi, V. Ramavajjala, "Neural Graph Machines: Learning Neural Networks Using Graphs", 2017, arXiv:1703.04818v1.

After the training system 300 determines the values of the image embedding model parameters 308 and the text embedding model parameters 310, the trained image embedding model 100 and text embedding model 200 can be used for any of a variety of purposes. A few examples follow.

In one example, the trained image embedding model 100 can be used by the search system 306 in ranking image search results responsive to a search query that includes a query image. More specifically, the search system 306 can use the image embedding model 100 to generate a respective embedding of each image in a search index maintained by the search system (as described with reference to FIG. 11). After receiving a search query that includes a query image, the search system 306 can use the image embedding model to generate an embedding of the query image, and thereafter use the generated embedding to determine a respective relevance score for each of multiple images in the search index. The search system 306 can determine the relevance score for a given image in the search index based on a measure of similarity (e.g., a Euclidean distance) between the embedding of the given image and the embedding of the query image. The search system 306 can determine the ranking of the image search results for the search query based at least in part on the relevance scores determined using the embeddings generated by the image embedding model 100.

In another example, the trained text embedding model and the trained image embedding model can both be used by the search system 306 in ranking image search results responsive to a search query that includes a sequence of one or more words. More specifically, the search system 306 can use the image embedding model 100 to generate a respective embedding of each image in a search index maintained by the search system. After receiving a search query that includes a sequence of one or more words, the search system can use the text embedding model to generate an embedding of the sequence of words, and thereafter use the generated embedding to determine a respective relevance score for each of multiple images in the search index. The search system can determine the relevance score for a given image in the search index based on a measure of similarity (e.g., a Euclidean distance) between the embedding of the given image and the embedding of the sequence of words of the search query. The search system 306 can determine the ranking of the image search results for the search query based at least in part on the relevance scores determined using the embeddings generated by the image embedding model and the text embedding model.

In another example, the trained text embedding model can be used to determine "clusters" of similar keywords (or keyword sequences), that is, sets of keywords which express similar semantic content. In a particular example, a cluster of similar keywords may be: "shoes", "shoe", "footwear", "boots", "cleats", "heels", "slippers", "sneakers", and the like. Keyword clusters can be generated using the text embedding model by determining a respective embedding of each keyword in a corpus of keywords, and thereafter using a clustering algorithm to cluster the keywords based on their respective embeddings. The clustering algorithm may be, for example, a k-means clustering algorithm or an expectation maximization clustering algorithm. Keyword clusters generated using the trained text embedding model can be used as distribution parameters that condition the transmission of digital components (e.g., advertisements) for presentation with electronic documents (e.g., webpages).

In another example, the trained text embedding model and the trained image embedding model can both be used in an image classification system configured to process an image to generate an output which associates the image with a label from a predetermined set of labels. For examples, the labels may specify object classes (e.g., person, cat, vehicle, and the like), and the image classification system may be trained to associate an image with the label of an object depicted in the image. In this example, the image classification system may use the image embedding model 100 to generate an embedding of an input image, and the text embedding model to generate a respective embedding of each search query in a corpus of search queries. The image classification system may determine a respective measure of similarity between the embedding of the input image and the respective embedding of each search query, and may thereafter associate the input image with a particular search query with the highest measure of similarity. The image classification system may determine the label to associate with the input image based on both: (i) visual features derived from the input image, and (ii) semantic features derived from the particular search query. An example of an image classification system that can use the text embedding model 200 and the image embedding model 100 is described with reference to U.S. Patent Application No. 62/768,701.

Figure 11:
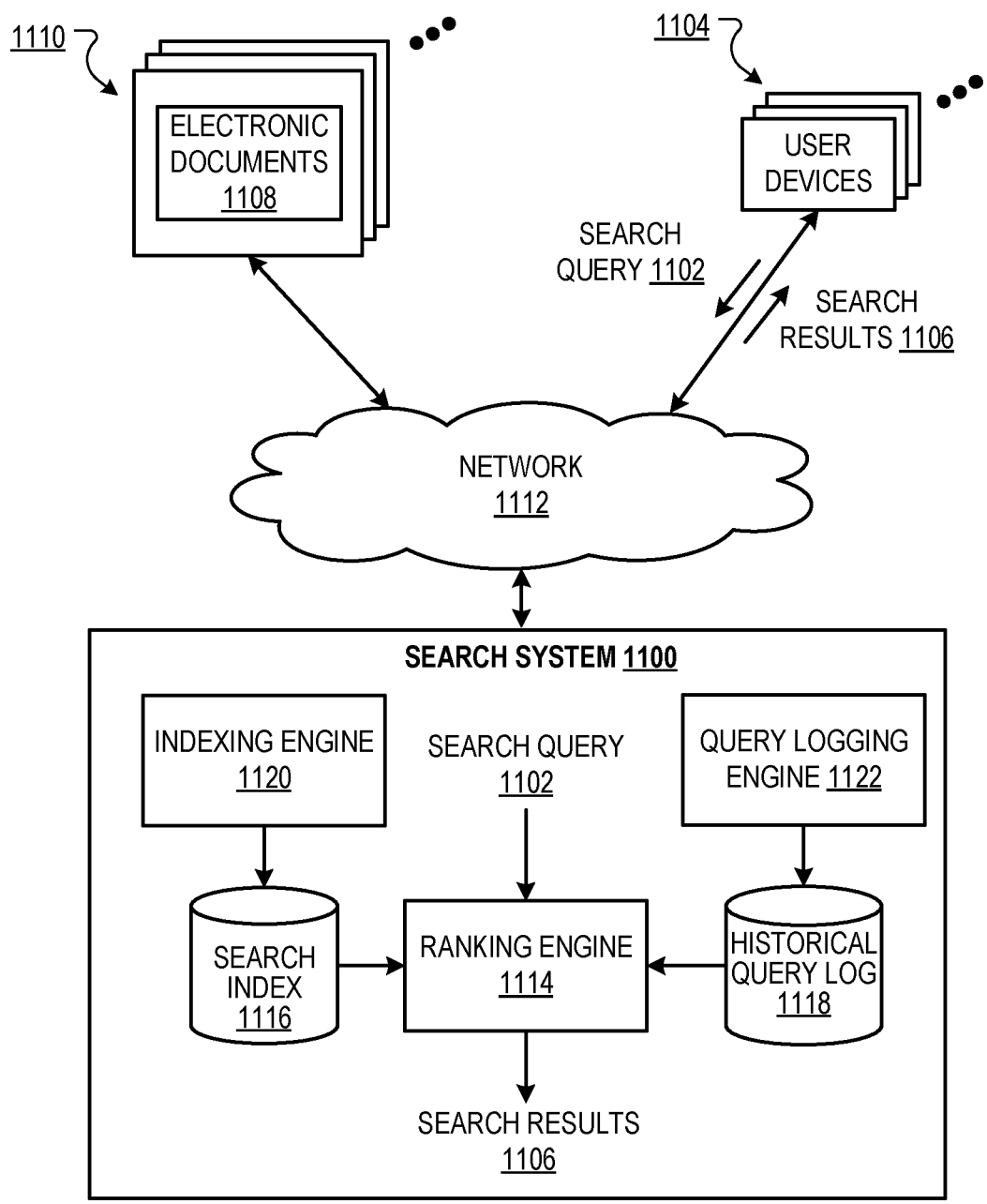
FIG. 11 shows an example search system.

FIG. 11 shows an example search system 100. The search system 100 is an example of a system implemented as computer programs on one or more computers in one or more locations in which the systems, components, and techniques described below are implemented.

The search system 1100 is configured to receive a search query 1102 from a user device 1104, to process the search query 1102 to determine one or more search results 1106 responsive to the search query 1102, and to provide the search results 1106 to the user device 1104. The search query 1102 can include search terms expressed in a natural language (e.g., English), images, audio data, or any other appropriate form of data. A search result 1106 identifies an electronic document 1108 from a website 1110 that is responsive to the search query 1102, and includes a link to the electronic document 1108. Electronic documents 1108 can include, for example, images, HTML webpages, word processing documents, portable document format (PDF) documents, and videos. The electronic documents 1108 can include content, such as words, phrases, images, and audio data, and may include embedded information (e.g., meta information and hyperlinks) and embedded instructions (e.g., scripts). A website 1110 is a collection of one or more electronic documents 1108 that is associated with a domain name and hosted by one or more servers. For example, a website 1110 may be a collection of webpages formatted in hypertext markup language (HTML) that can contain text, images, multimedia content, and programming elements (e.g., scripts).

In a particular example, a search query 1102 can include the search terms "Apollo moon landing", and the search system 1100 may be configured to perform an image search, that is, to provide search results 1106 which identify respective images that are responsive to the search query 1102. In particular, the search system 1100 may provide search results 1106 that each include: (i) a title of a webpage, (ii) a representation of an image extracted from the webpage, and (iii) a hypertext link (e.g., specifying a uniform resource locator (URL)) to the webpage or to the image itself. In this example, the search system 1100 may provide a search result 1106 that includes: (i) the title "Apollo moon landing" of a webpage, (ii) a reduced-size representation (i.e., thumbnail) of an image of the Apollo spacecraft included in the webpage, and (iii) a hypertext link to the image.

A computer network 1112, such as a local area network (LAN), wide area network (WAN), the Internet, a mobile phone network, or a combination thereof, connects the websites 1110, the user devices 1104, and the search system 1100 (i.e., enabling them to transmit and receive data over the network 1112). In general, the network 1112 can connect the search system 1100 to many thousands of websites 1110 and user devices 1104.

A user device 1104 is an electronic device that is under control of a user and is capable of transmitting and receiving data (including electronic documents 1108) over the network 1112. Example user devices 1104 include personal computers, mobile communication devices, and other devices that can transmit and receive data over the network 1112. A user device 1104 typically includes user applications (e.g., a web browser) which facilitate transmitting and receiving data over the network 1112. In particular, user applications included in a user device 1104 enable the user device 1104 to transmit search queries 1102 to the search system 1100, and to receive the search results 1106 provided by the search system 1100 in response to the search queries 1102, over the network 1112.

The user applications included in the user device 1104 can present the search results 1106 received from the search system 1100 to a user of the user device (e.g., by rendering a search results page which shows an ordered list of the search results 1106). The user may select one of the search results 1106 presented by the user device 1104 (e.g., by clicking on a hypertext link included in the search result 1106), which can cause the user device 1104 to generate a request for an electronic document 1108 identified by the search result 1106. The request for the electronic document 1108 identified by the search result 1106 is transmitted over the network 1112 to a website 1110 hosting the electronic document 1108. In response to receiving the request for the electronic document 1108, the website 1110 hosting the electronic document 1108 can transmit the electronic document 1108 to the user device 1104.

The search system 1100 processes a search query 1102 using a ranking engine 1114 to determine search results 1106 responsive to the search query 1102.

The search system 1100 uses an indexing engine 1120 to generate and maintain the search index 1116 by "crawling" (i.e., systematically browsing) the electronic documents 1108 of the websites 1110. For each of a large number (e.g., millions) of electronic documents 1108, the search index 1116 indexes the electronic document by maintaining data which: (i) identifies the electronic document 1108 (e.g., by a link to the electronic document 1108), and (ii) characterizes the electronic document 1108. The data maintained by the search index 1116 which characterizes an electronic document may include, for example, data specifying a type of the electronic document (e.g., image, video, PDF document, and the like), a quality of the electronic document (e.g., the resolution of the electronic document when the electronic document is an image or video), keywords associated with the electronic document, a cached copy of the electronic document, or a combination thereof.

The search system 1100 can store the search index 1116 in a data store which may include thousands of data storage devices. The indexing engine 1120 can maintain the search index 1116 by continuously updating the search index 1116, for example, by indexing new electronic documents 1108 and removing electronic documents 1108 that are no longer available from the search index 1116.

The search system 1100 uses a query logging engine 1122 to generate and maintain a historical query log 1118 (as described earlier). The search system 1100 can store the historical query log 1118 in a data store which may include thousands of data storage devices. The query logging engine 1122 can maintain the historical query log 1118 by continuously updating the historical query log 1118 (e.g., by indexing new search queries as they are processed by the search system 1100).

The ranking engine 1114 determines search results 1106 responsive to the search query 1102 by scoring electronic documents 1108 indexed by the search index 1116. The ranking engine 1114 can score electronic documents 1108 based in part on data accessed from the historical query log 1118. The score determined by the ranking engine 1114 for an electronic document 1108 characterizes how responsive (e.g., relevant) the electronic document is to the search query 1102. The ranking engine 1114 determines a ranking of the electronic documents 1108 indexed by the search index 1116 based on their respective scores, and determines the search results based on the ranking. For example, the ranking engine 1114 can generate search results 1106 which identify the highest-ranked electronic documents 1108 indexed by the search index 1116.

Figure 12:
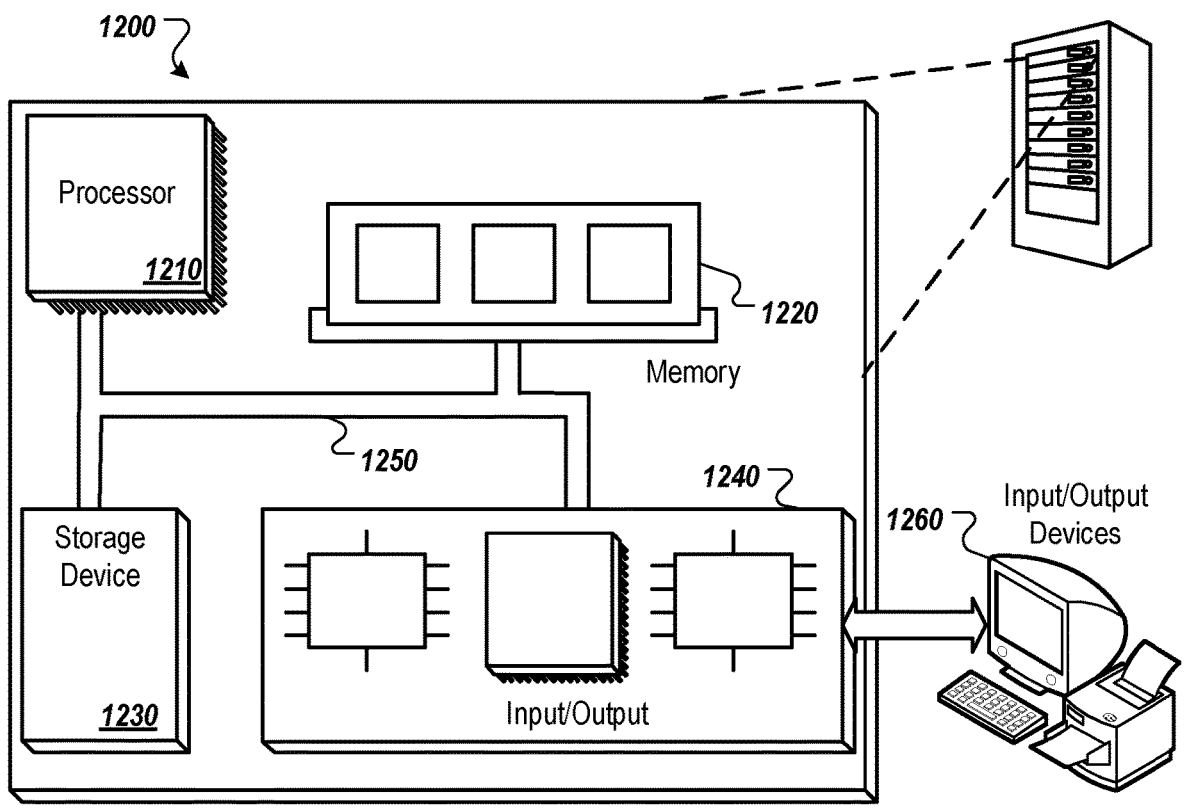
FIG. 12 shows an example computer system.
Like reference numbers and designations in the various drawings indicate like elements.

FIG. 12 is block diagram of an example computer system 1200 that can be used to perform operations described above. The system 1200 includes a processor 1210, a memory 1220, a storage device 1230, and an input/output device 1240. Each of the components 1210, 1220, 1230, and 1240 can be interconnected, for example, using a system bus 1250. The processor 1210 is capable of processing instructions for execution within the system 1200. In one implementation, the processor 1210 is a single-threaded processor. In another implementation, the processor 1210 is a multi-threaded processor. The processor 1210 is capable of processing instructions stored in the memory 1220 or on the storage device 1230.

The memory 1220 stores information within the system 1200. In one implementation, the memory 1220 is a computer-readable medium. In one implementation, the memory 1220 is a volatile memory unit. In another implementation, the memory 1220 is a non-volatile memory unit.

The storage device 1230 is capable of providing mass storage for the system 1200. In one implementation, the storage device 1230 is a computer-readable medium. In various different implementations, the storage device 1230 can include, for example, a hard disk device, an optical disk device, a storage device that is shared over a network by multiple computing devices (e.g., a cloud storage device), or some other large capacity storage device.

The input/output device 1240 provides input/output operations for the system 1200. In one implementation, the input/output device 1240 can include one or more network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 1260. Other implementations, however, can also be used, such as mobile computing devices, mobile communication devices, set-top box television client devices, etc.

Although an example processing system has been described in FIG. 12, implementations of the subject matter and the functional operations described in this specification can be implemented in other types of digital electronic circuitry, or in computer software, firmware, or hardware, including the structures disclosed in this specification and their structural equivalents, or in combinations of one or more of them.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus, the method comprising:
   obtaining training data comprising a plurality of training examples, wherein each training example comprises:
      an image pair comprising a first image and a second image; and
      selection data indicating a click rate of the image pair; and
   using the training data to train an image embedding model having a plurality of image embedding model parameters, wherein the training comprises, for each of the plurality of training examples:
      processing the first image of the training example using the image embedding model to generate an embedding of the first image;
      processing the second image of the training example using the image embedding model to generate an embedding of the second image;
      determining a measure of similarity between the embedding of the first image and the embedding of the second image; and
      adjusting the image embedding model parameters based at least in part on: (i) the measure of similarity between the embedding of the first image and the embedding of the second image, and (ii) the selection data of the training example.

2. The method of claim 1, wherein the click rate of the image pair comprises a co-click rate of the image pair, wherein the co-click rate of the image pair characterizes how often users select both the first image and the second image in response to both the first image and the second image being concurrently identified by search results for a search query.

3. The method of claim 2, wherein the co-click rate for each training example indicates a fraction of times users selected both the first image and the second image of the training example in response to both the first image and the second image of the training example being concurrently identified by search results for a search query.

4. The method of claim 1, wherein the click rate of the image pair comprises a similar-image click rate of the image pair, wherein the similar-image click rate of the image pair characterizes how often users select either the first image or the second image in response to the first image or the second image being identified by a search result for a search query respectively comprising either the second image or the first image.

5. The method for claim 4, wherein the similar-image click rate for each training example indicates a fraction of times users selected either the first image or the second image in response to the first image or the second image being identified by a search result for a search query respectively comprising either the second image or the first image.

6. The method of claim 1, wherein the training data is generated using a historical query log of a web search system.

7. The method of claim 1, wherein the image embedding model comprises a convolution neural network.

8. The method of claim 7, wherein adjusting the image embedding model parameters comprises:
   determining a gradient of a loss function that depends on:
      (i) the measure of similarity between the embedding of the first image and the embedding of the second image, and (ii) the selection data of the training example; and
   using the gradient to adjust the image embedding model parameters.

9. The method for claim 8, wherein the loss function comprises a multiplicative scaling factor that is determined based on the selection data of the training example.

10. The method for claim 9, wherein the multiplicative scaling factor is determined as a linear combination of a co-click rate and a similar-image click rate of the training example.

11. The method of claim 1, wherein determining a measure of similarity between the embedding of the first image and the embedding of the second image comprises:
   determining a Euclidean distance between the embedding of the first image and the embedding of the second image.

12. A system comprising:
   one or more computers; and
   one or more storage devices communicatively coupled to the one or more computers, wherein the one or more storage devices store instructions that, when executed by the one or more computers, cause the one or more computers to perform operations comprising:
      obtaining training data comprising a plurality of training examples wherein each training example comprises:
         an image pair comprising a first image and a second image; and
         selection data indicating a click rate of the image pair; and
      using the training data to train an image embedding model having a plurality of image embedding model parameters, wherein the training comprises, for each of the plurality of training examples:
         processing the first image of the training example using the image embedding model to generate an embedding of the first image;
         processing the second image of the training example using the image embedding model to generate an embedding of the second image;

determining a measure of similarity between the embedding of the first image and the embedding of the second image; and adjusting the image embedding model parameters based at least in part on: (i) the measure of similarity between the embedding of the first image and the embedding of the second image, and (ii) the selection data of the training example.

13. The system of claim 12, wherein the click rate of the image pair comprises a co-click rate of the image pair, wherein the co-click rate of the image pair characterizes how often users select both the first image and the second image in response to both the first image and the second image being concurrently identified by search results for a search query.

14. The system of claim 13, wherein the co-click rate for each training example indicates a fraction of times users selected both the first image and the second image of the training example in response to both the first image and the second image of the training example being concurrently identified by search result for a search query.

15. The system of claim 12, wherein the click rate of the image pair comprises a similar-image click rate of the image pair, wherein the similar-image click rate of the image pair characterizes how often users select either the first image or the second image in response to the first image or the second image being identified by a search result for a search query respectively comprising either the second image or the first image.

16. The system of claim 15, wherein the similar-image click rate for each training example indicates a fraction of time users selected either the first image or the second image in response to the first image or the second image being identified by a search result for a search query respectively comprising either the second image or the first image.

17. The system of claim 12, wherein the training data is generated using a historical query log of a web search system.

18. One or more non-transitory computer storage media storing instructions that when executed by one or more computers cause the one or more computers to perform operations comprising:

obtaining training data comprising a plurality of training examples, wherein each training example comprises:

an image pair comprising a first image and a second image; and selection data indicating a click rate of the image pair; and using the training data to train an image embedding model having a plurality of image embedding model parameters wherein the training comprises, for each of the plurality of training examples:

processing the first image of the training example using the image embedding model to generate an embedding of the first image;

processing the second image of the training example using the image embedding model to generate an embedding of the second image;

determining a measure of similarity between the embedding of the first image and the embedding of the second image; and adjusting the image embedding model parameters based at least in part on: (i) the measure of similarity between the embedding of the first image and the embedding of the second image, and (ii) the selection data of the training example.

19. The non-transitory computer storage media of claim 18, wherein the click rate of the image pair comprises a co-click rate of the image pair, wherein the co-click rate of the image pair characterizes how often users select both the first image and the second image in response to both the first image and the second image being concurrently identified by search results for a search query.

20. The non-transitory computer storage media of claim 18, wherein the click rate of the image pair comprises a similar-image click rate of the image pair, wherein the similar-image click rate of the image pair characterizes how often users select either the first image or the second image in response to the first image or the second image being identified by a search result for a search query respectively comprising either the second image or the first image.

* * * * *